UNITED STATES PATENT OFFICE.

THOMAS W. SMILLIE, OF WASHINGTON, DISTRICT OF COLUMBIA.

COATING OBJECTS OF WHICH PHOTOGRAPHS ARE DESIRED SO AS TO REMOVE ALL TRACES OF DISCOLORATION, &c.

No. 894,545.  Specification of Letters Patent.  Patented July 28, 1908.

Application filed April 21, 1908. Serial No. 428,441.

(DEDICATED TO THE PUBLIC.)

*To all whom it may concern:*

Be it known that I, THOMAS W. SMILLIE, a citizen of the United States, residing at Washington, in the District of Columbia, have invented certain new and useful Improvements in Coating Objects of Which Photographs are Desired so as to Remove All Traces of Discoloration, &c., of which the following is a specification.

The object of my invention is to produce upon the surface of geological or other specimens, a uniform white coating which will remove irregularities of coloration without obliterating the most delicate sculpturing and thus preserve for photography, illustration, or study the minutest structural details of the specimen treated.

The distinguishing characteristics of my invention consist in the use of a solution of anilin oil, or other substances of like character, in sulfuric ether, or other solvents—the proportions being one part of anilin oil to six (more or less) of solvent—for coating the specimen. After the fluid has been applied to the specimen, by immersion or otherwise, the surplus is then allowed to drain off, and the solvent to evaporate. The specimen is then placed in a suitable closed chamber with an open vessel containing hydrochloric, or other acids, whose fumes are allowed to circulate by natural or mechanical means and unite with the anilin oil upon the specimen, producing the white coating desired.

I claim:

A new process consisting of the formation by synthesis (upon the surface of the object to be photographed) of a white opaque film which may be removed by evaporation or solution and the specimen restored to its normal condition.

In testimony whereof I affix my signature in presence of two witnesses.

THOMAS W. SMILLIE.

Witnesses:
L. D. BURLING,
J. LOUIS WILLIGE.